United States Patent [19]
Sato

[11] Patent Number: 5,275,352
[45] Date of Patent: Jan. 4, 1994

[54] BAITCASTING REEL

[75] Inventor: Jun Sato, Sakai, Japan

[73] Assignee: Shimano, Inc., Osaka, Japan

[21] Appl. No.: 739,489

[22] Filed: Aug. 2, 1991

[30] Foreign Application Priority Data

Aug. 8, 1990 [JP] Japan .................. 2-84279[U]

[51] Int. Cl.$^5$ .................................. A01K 89/033
[52] U.S. Cl. ........................... 242/261; 242/310
[58] Field of Search ........... 242/261, 260, 259, 310

[56] References Cited

U.S. PATENT DOCUMENTS

| | | | |
|---|---|---|---|
| 4,014,422 | 3/1977 | Morishita | 242/261 X |
| 4,222,537 | 9/1980 | Noda | 242/261 X |
| 4,379,530 | 4/1983 | Kobayashi | 242/261 |
| 4,406,427 | 9/1983 | Murakami | 242/261 |
| 4,899,952 | 2/1990 | Aoki | 242/260 |
| 4,927,095 | 5/1990 | Young | 242/261 |
| 4,964,590 | 10/1990 | Sato | 242/261 |
| 5,069,396 | 12/1991 | Noda | 242/261 X |

FOREIGN PATENT DOCUMENTS

| | | | |
|---|---|---|---|
| 721724 | 1/1955 | United Kingdom . | |
| 1092042 | 11/1967 | United Kingdom | 242/261 |
| 2092872 | 8/1982 | United Kingdom . | |
| 2206022 | 12/1988 | United Kingdom . | |

*Primary Examiner*—Stanley N. Gilreath
*Attorney, Agent, or Firm*—Dickstein, Shapiro & Morin

[57] ABSTRACT

A baitcasting reel includes a spool for taking up a fishing line between a pair of right and left side cases, a handle attached to either of the side cases for rotating the spool, a clutch mechanism disposed inside the side case carrying the handle and operable to allow or break force transmission between the handle and a clutch control member operable to cause the clutch mechanism to break the force transmission. The clutch control member is disposed rearwardly of the spool and supported only to the one side case carrying the handle and positioned away from the other side case.

7 Claims, 4 Drawing Sheets

BAITCASTING REEL

BACKGROUND OF THE INVENTION

1. Field of the Invention

The present invention relates to a baitcasting reel, and more particularly to a baitcasting reel including a spool for taking up a fishing line between a pair of right and left side cases, a handle attached to either of the side cases for rotating the spool, and a clutch mechanism disposed inside the side case carrying the handle and operable to allow or break force transmission between the handle and the spool.

2. Description of the Related Art

A conventional baitcasting reel having the above-described construction is known from e.g. Japanese laid-open patent gazette No. 59-192031. According to this reel construction, the clutch mechanism is operated for breaking the power transmission by means of a thumbing member (a kind of control member) extending between the right and left side cases to be depressed by the angler's thumb.

With the above construction, since the clutch control member is extended between the right and left side cases, it is necessary for side ends of this control member to be movable relative to the inner faces of the side cases.

For assuring such relative movements without causing physical distortion between these parts, it is essential that the side ends of the control member and the inner faces of the cases be manufactured with relatively high precision. In this respect, the conventional construction has room for improvement.

Incidentally, if such physical distortion occurs at said parts, this may bring the control member unoperable at all as the member is locked between the cases.

Taking the above-described state of the art into consideration, the primary object of the present invention is to provide an improved baitcasting reel which allows easy and comfortable reel operation while minimizing the physical distortion of the clutch mechanism control member.

SUMMARY OF THE INVENTION

For accomplishing the above-described object, a baitcasting reel, according to the present invention, comprises:

a spool for taking up a fishing line between a pair of right and left side cases;

a handle attached to either of the side cases for rotating the spool;

a clutch mechanism disposed inside the side case carrying the handle and operable to allow or break force transmission between the handle and the spool; and a clutch control member operable to cause the clutch mechanism to break the force transmission, said control member being disposed rearwardly of said spool and supported only to said side case carrying the handle and positioned away from said other side case.

Functions and effects of this construction will be described next.

This construction can be embodied as shown in FIG. 1, for example. In this, the clutch control member 14 too, like that of the conventional reel, is constructed as a slide operation type; yet, as this control member 14 is attached only to the one side case 1, it is possible to construct the control member 14 operable only with such relatively low manufacturing precision as being just sufficient to allow relative movement between a base end of the control member 14 and this side case 1. That is, unlike the conventional, the other side case need not be manufactured with high precision.

Further, this control member 14 is supported only to the one side case 1 and detached from the other side case 1. Therefore, even when this control member 14 is improperly displaced by e.g. too strong an operating force, there occurs no locking due to physical distortion of this control member 14 between the right and left side cases 1, 1.

As a result, the invention has achieved an improved baitcasting reel which is easy and inexpensive to manufacture because of reduction in the number of parts requiring high manufacturing precision and which yet assures reliable and smooth clutch control member operation even when this member is operated with a strong force.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a baitcasting reel relating to the present invention; in which.

DESCRIPTION OF THE PREFERRED EMBODIMENTS

Preferred embodiments of a baitcasting reel relating to the present invention will now be described in detail with reference to the accompanying drawings.

Figure 1:
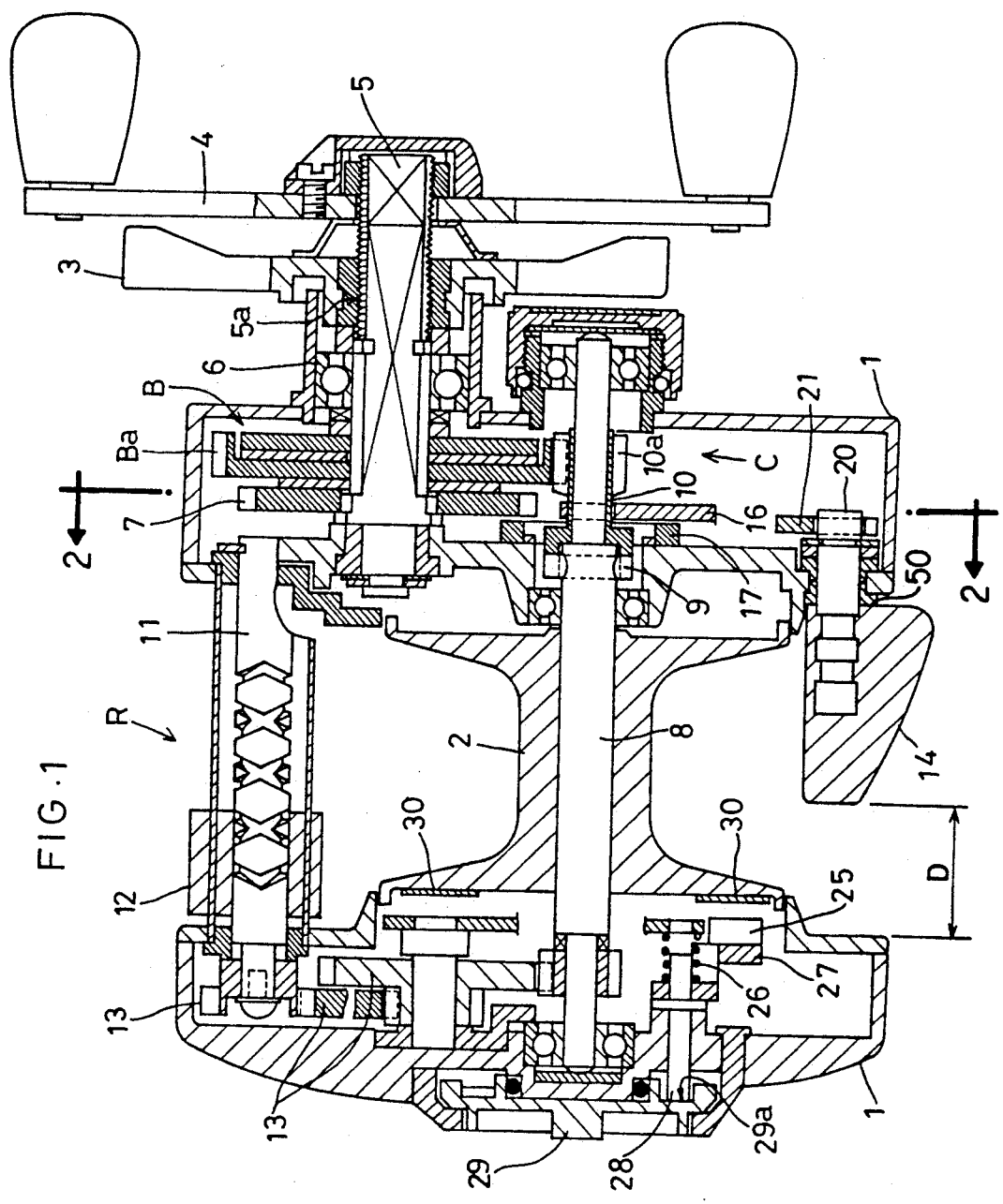
FIG. 1 is a plan view in section showing a baitcasting reel according to one preferred embodiment of the present invention.

As shown in FIG. 1, a baitcasting reel includes a pair of right and left side cases 1, 1, a levelwind mechanism R disposed between the side cases 1, 1, a spool 2 also disposed between these cases 1, 1, and a drag control member 3 and a handle 4 both attached to the right side case 1. The right side case 1 has an inner wall 100 and an outer wall 102. An inside space 104 is defined between the inner and outer walls 100, 102. The left side case 1 has an inner wall 106 and an outer wall 108. An inside space 110 is defined between the inner and outer walls 106, 108 of the left side case 1.

Figure 2:
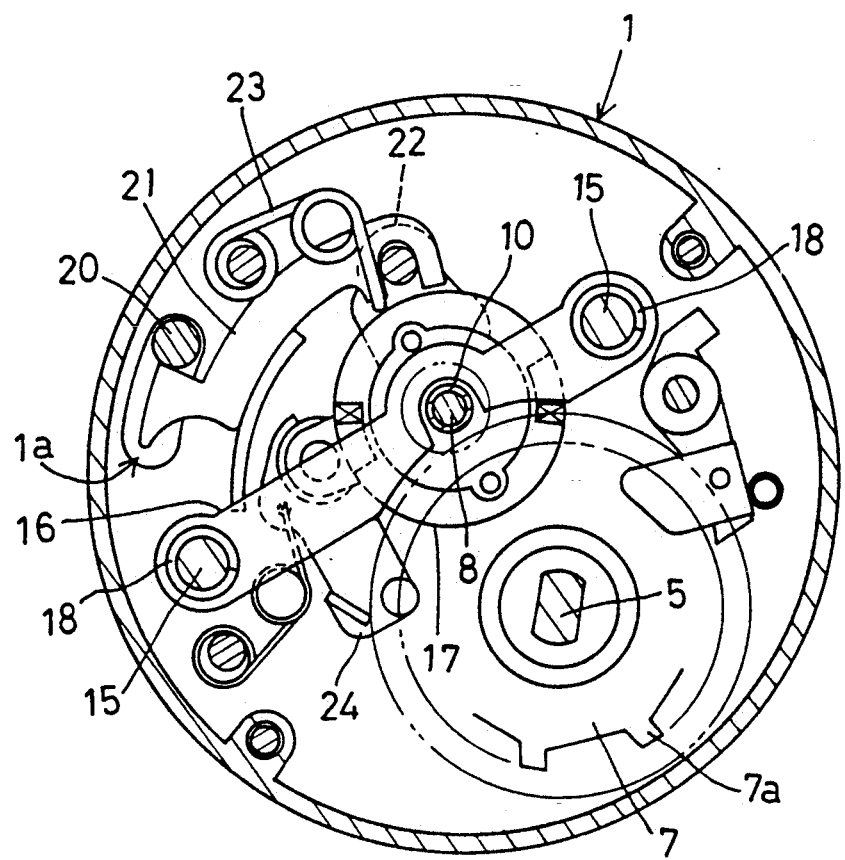
FIG. 2 is a side view in section, taken along the line 2—2 of FIG. 1, showing a right side case of the reel.
Figure 3:
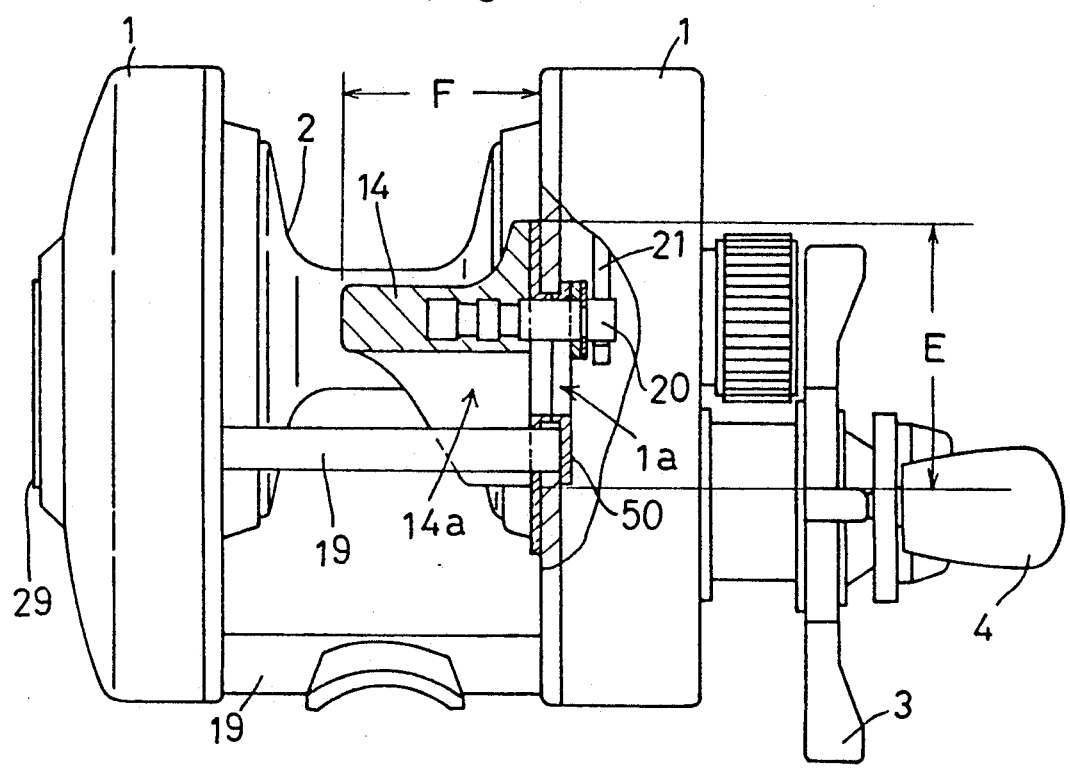
FIG. 3 is a partially cutaway rear view of the reel.

As shown in FIGS. 1 through 3, the handle 4 is attached on an outer end of a handle shaft 5 supported to the right side case 1. And, the drag control member 3 is screwed on a threaded portion 5a of the handle shaft 5. This handle shaft 5 further mounts thereon a drag mechanism B, on which a pressing force from the drag control member 3 is applied through a ball bearing 6, and an anti-reverse ratchet wheel 7.

A spool shaft 8 rotatable with the spool 2 mounts, adjacent a right end thereof, a pin 9 and a sleeve member 10 slide-engageable with and slide-disengageable from the pin 9. The sleeve member 10 has an input gear portion 10a meshable with an output gear portion Ba of the drag mechanism B.

The above-described pin 9 and the sleeve member 10 will be generically referred to as a clutch mechanism C hereinafter. This clutch mechanism C allows transmission of force from the handle 5 to the spool when the pin 9 and the sleeve member 10 become engaged with each other (a clutching operation). Conversely, the mechanism C breaks the force transmission for rendering the spool freely rotatable when the pin 9 and the sleeve member 10 become disengaged from each other (a declutching operation).

The levelwind mechanism R includes a line guide member 12 horizontally reciprocable along a worm shaft 11 extending between the right and left side cases 1, 1. Further, a plurality of transmission gears 13 . . . are disposed between a left terminal end of the worm shaft 11 and a terminal end of the spool shaft 8. Accordingly, this levelwind mechanism R is operable in association with rotation of the spool 2.

In this baitcasting reel of the invention, a control member 14 for controlling the clutch mechanism C is disposed on the side of the spool 2 opposite the levelwind mechanism R (i.e., opposite the direction which line is payed off from or taken up onto the spool 2). In other words, the control member 14 is located at the rear side of the spool 2. The control member 14 is supported to the right side case 1 carrying the handle 4. The control member 14 extends through a bushing or collar 50 as illustrated in FIGS. 1 and 3. On the other hand, a gap D is formed between a free end of this control member 14 and the opposite, i.e. left side case 1. Moreover, a sliding portion of the control member 14 has a length E longer than a projecting length F of this control member 14. The sliding portion is the portion of the control member 14 that is in position to slide against the right side case 1. The length E of the sliding portion is illustrated in FIG. 3. With these arrangements, this clutch mechanism control member 14 can be operated smoothly and stably without physical distortion thereof.

The above-described sleeve member 10 is engaged with a shifter 16 slidably supported to a pair of shaft members 15, 15 extending in parallel with the spool shaft 2. This shifter 16 is operated for engagement by means of a forward rotational force from a ring-shaped cam member 17 disposed coaxially with the spool shaft 2. The shifter is operated for disengagement by means of an urging force of a coil spring 18 fitted on the shaft members 15, 15 when the cam member 17 is reversely rotated.

Between the right and left side cases 1, 1, there are interposed a plurality of frame rod elements 19 . . . ; and one of these elements is inserted into an arcuate hole 14a defined in the control member 14. Whereas, a control pin 20 projecting continuously from this control member 14 is inserted into an arcuate hole 1a defined in the right side case 1. Accordingly, this control member 14 is rendered reciprocable along an arcuate moving path substantially centering about a center of this side case 1. Further, with establishment of engagement between a control element 21 contactable with a terminal end of the control pin 20 and an arm portion 22 of the cam member 17, the control member 14, when pushed down, is operable to cause the clutch mechanism C to break the force transmission.

More particularly, when the clutch mechanism C is operated to break the transmission, the cam member 17 maintains its declutching position due to a function of a toggle spring 23 (the position of the control member 14 is not maintained and therefore the member 14 is movable upwards). On the other hand, a pivot arm 24 supported to this cam member 17 reaches a position engageable with claws 7a. . . of the ratchet wheel 7. So that, a push returning force, transmitted to the cam member 17 through the pivot arm 24 with rotation of the handle 4 in a line takeup direction, pushes back the cam member 17 thus returning the clutch mechanism C back to its clutching position.

Further, in this baitcasting reel, a magnet brake mechanism is accommodated in the left side case 1. In this brake mechanism, there are provided a plurality of magnets 25 . . . ; and a rod 28 projecting from a plate 27 urged by a spring 26 in a direction away from the spool 2 is placed into abutment against a cam face 29a of a rotary operation type knob 29. Accordingly, a braking force of this mechanism is adjustable by a rotary operation of the knob 29 which operation varies a gap between the magnets 25 and a side metal plate 30 of the spool.

Some other embodiments of the present invention will be described next.

Figure 4:
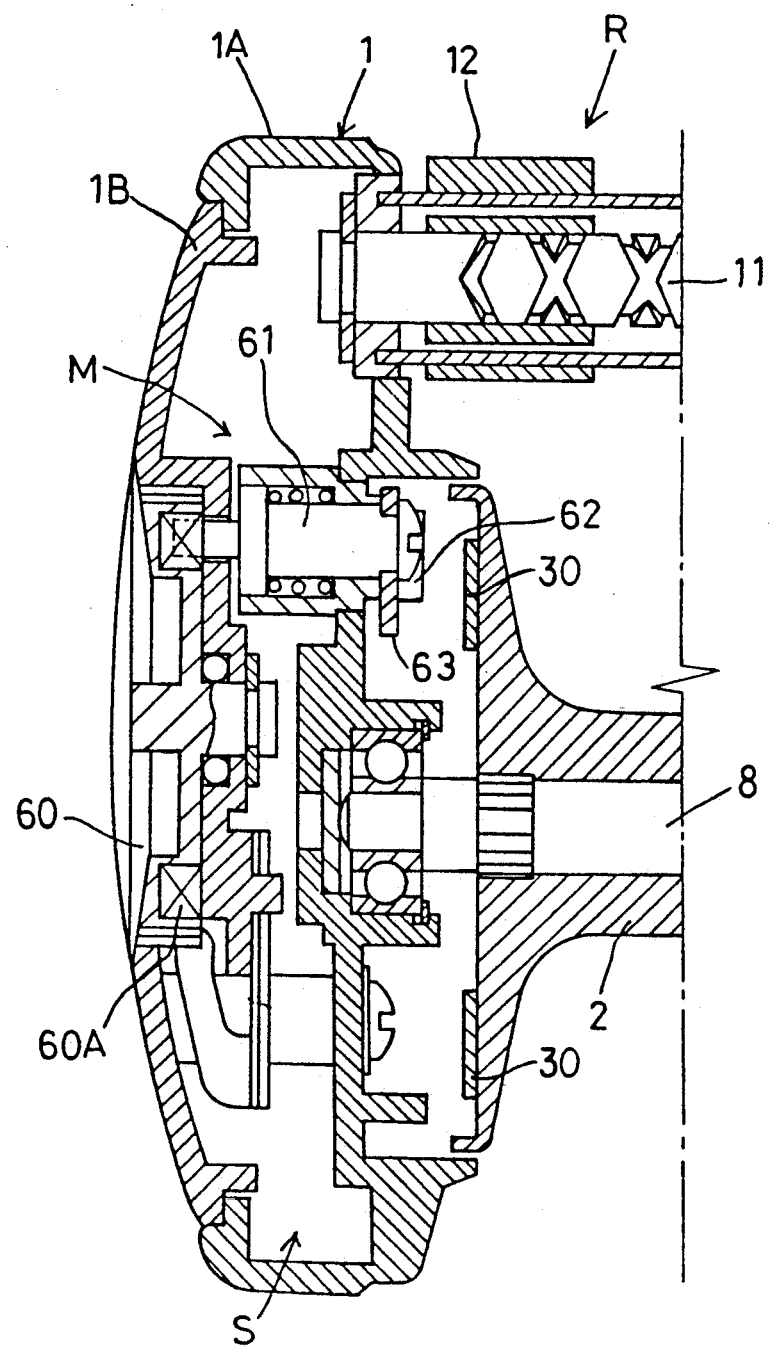
FIG. 4 is a partial section showing the reel of the further embodiment.

Further alternately, as shown in FIG. 4, in embodying the present invention, it is conceivable for the left side case 1 to include a one-piece body portion 1A and a lid portion 1B so that this side case 1 is openable to the ambience. In this alternate construction, at an inner space S of the case, there is provided a magnet brake mechanism M including a rotary knob 60, a rod 61 projectable and retractable through its contact with a cam portion 60A of the knob 60 and a plate 63 carrying a magnet 62. The plate 63 is secured to the rod 61.

Incidentally, all the components of these alternate embodiments are denoted with the same reference marks and numerals as those employed in the foregoing embodiment when these are to perform substantially the same functions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A baitcasting reel comprising:
   first and second side cases, said first side case having an inner wall and an outer wall, said inner and outer walls defining an inside space;
   a spool having a front side for taking up a fishing line, said spool also having a rear side, and a spool shaft for supporting said spool, said spool being located between said side cases;
   a handle, and torque transmission means for transmitting torque from said handle to said spool, said torque transmission means including a handle shaft attached to said handle, said handle shaft being supported by said first side case;
   a clutch mechanism for selectively allowing and breaking the transmission of torque from said handle to said spool, said clutch mechanism being disposed within said inside space of said first side case; and a clutch control member for operating said clutch mechanism, said control member being supported only by said inner wall of said first side case, said control member being located at the rear side of said spool, said control member projecting toward said second side case in a direction that is substantially parallel to said spool shaft, and said control member having a free end positioned away from said second side case.

2. A baitcasting reel comprising:

first and second side cases, each of said cases having an inner wall and an outer wall, said inner and outer walls of said first side case defining an inside space;

a spool having a front side for taking up a fishing line, said spool also having a rear side, said spool being located between said side cases;

a spool shaft for supporting said spool;

a handle, and torque transmission means for transmitting torque from said handle to said spool, said torque transmission means including a handle shaft attached to said handle, said handle shaft being supported by said first side case;

a clutch mechanism for selectively allowing and breaking the transmission of torque from said handle to said spool, said clutch mechanism including an engaged portion attached to said spool shaft, said engaged portion being non-rotatable relative to said spool shaft, a sleeve rotatably mounted on said spool shaft, said sleeve having an engaging portion engageable with said engaged portion, and a shifter for moving said sleeve, said clutch mechanism being disposed within said inside space of said first side case;

a hole defined in said inner wall of said first side case, said hole being located at said rear side of said spool; and a clutch control member for operating said clutch mechanism, said control member having a supported end and a free end, said control member being supported as a cantilever, with said supported end being inserted through said hole, and wherein said control member projects toward said second side case in a direction that is substantially parallel to said spool shaft, with said free end of said control member being positioned away from said second side case.

3. A baitcasting reel as defined in claim 2, wherein one of said side cases accommodates therein a magnet brake mechanism.

4. A baitcasting reel as defined in claim 2, wherein said second side case includes a one-piece body portion and a detachable lid portion.

5. A baitcasting reel as defined in claim 4, wherein said second side case accommodates bearing means for said spool shaft.

6. A baitcasting reel as defined in claim 2, wherein at least one of said cases has an outer periphery surrounding the axis of said spool shaft, and wherein said clutch control member is movable within said hole in a direction that is substantially parallel to said outer periphery.

7. A baitcasting reel as defined in claim 6, wherein said control member has a sliding portion contacting said inner wall of said first side case, said sliding portion having a length (E) in the direction that is substantially parallel to said outer periphery, said length (E) being longer than the distance (F) between said free end of said control member and said inner wall of said first side case.

* * * * *